(12) United States Patent
Wu

(10) Patent No.: US 11,632,491 B2
(45) Date of Patent: Apr. 18, 2023

(54) METHODS AND SYSTEMS FOR IDENTIFYING CAMERA LENS

(71) Applicant: ZHEJIANG DAHUA TECHNOLOGY CO., LTD., Zhejiang (CN)

(72) Inventor: Wei Wu, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 316 days.

(21) Appl. No.: 16/911,376

(22) Filed: Jun. 24, 2020

(65) Prior Publication Data
US 2020/0326500 A1 Oct. 15, 2020

Related U.S. Application Data

(63) Continuation of application No. PCT/CN2018/123368, filed on Dec. 25, 2018.

(30) Foreign Application Priority Data

Dec. 26, 2017 (CN) .......................... 201711442862.X

(51) Int. Cl.
| | | |
|---|---|---|
| H04N 5/225 | (2006.01) | |
| G02B 7/10 | (2021.01) | |
| H02H 7/08 | (2006.01) | |
| G03B 3/10 | (2021.01) | |
| H04N 5/232 | (2006.01) | |

(52) U.S. Cl.
CPC ............ *H04N 5/2254* (2013.01); *G02B 7/10* (2013.01); *G03B 3/10* (2013.01); *H02H 7/0838* (2013.01); *G03B 2205/0069* (2013.01); *H04N 5/23241* (2013.01)

(58) Field of Classification Search
None
See application file for complete search history.

(56) References Cited

U.S. PATENT DOCUMENTS

| | | |
|---|---|---|
| 2004/0057705 A1 | 3/2004 | Kohno |
| 2013/0088636 A1 | 4/2013 | Inoue |
| | (Continued) | |

FOREIGN PATENT DOCUMENTS

| | | |
|---|---|---|
| CN | 201654414 U | 11/2010 |
| CN | 101174075 B | 2/2011 |
| | (Continued) | |

OTHER PUBLICATIONS

International Search Report in PCT/CN2018/123368 dated Mar. 26, 2019, 4 pages.

(Continued)

*Primary Examiner* — Quan Pham
(74) *Attorney, Agent, or Firm* — Metis IP LLC

(57) ABSTRACT

The present disclosure provides an image device. The image device may include a camera lens, one or more stepper motors to drive the camera lens, one or more H-bridge circuits configured to control at least one of the one or more stepper motors, and a lens-identification circuit connected with the one or more H-bridge circuits, wherein the lens-identification circuit includes an impedance network of which an impedance value corresponds to a type of the camera lens.

20 Claims, 12 Drawing Sheets

(56) References Cited

U.S. PATENT DOCUMENTS

| | | | |
|---|---|---|---|
| 2014/0071336 A1 | 3/2014 | Takanashi | |
| 2014/0239874 A1 | 8/2014 | Inoue | |
| 2016/0219194 A1* | 7/2016 | Barros | H04N 5/2254 |
| 2018/0352140 A1* | 12/2018 | Tsukamoto | G03B 17/14 |

FOREIGN PATENT DOCUMENTS

| | | | | |
|---|---|---|---|---|
| CN | 103001549 A | 3/2013 | | |
| CN | 204465398 U | 7/2015 | | |
| CN | 104935709 A | 9/2015 | | |
| CN | 104950556 A | 9/2015 | | |
| CN | 105357360 A | 2/2016 | | |
| CN | 106301109 A | 1/2017 | | |
| CN | 206759353 U | 12/2017 | | |
| EP | 2648041 A2 | 10/2013 | | |
| WO | WO-2018179319 A1 * | 10/2018 | | G02B 7/10 |
| WO | 2019128960 A1 | 7/2019 | | |

OTHER PUBLICATIONS

Written Opinion in PCT/CN2018/123368 dated Mar. 26, 2019, 6 pages.

First Office Action in Chinese Application No. CN201711442862.X dated Aug. 21, 2019, 15 pages.

\* cited by examiner

METHODS AND SYSTEMS FOR IDENTIFYING CAMERA LENS

CROSS-REFERENCE TO RELATED APPLICATIONS

This application is a Continuation of International Application No. PCT/CN2018/123368, filed on Dec. 25, 2018, which claims priority of Chinese Patent Application No. 201711442862.X filed on Dec. 26, 2017, the contents of each of which are hereby incorporated by reference in their entirety.

TECHNICAL FIELD

The present disclosure generally relates to image capture, and more specifically relates to methods and systems for identifying a camera lens.

BACKGROUND

During a process for capturing images or videos using an image device, a control component, such as a digital signal processor (DSP), in the image device may acquire image capture parameters (e.g., a focal length, a size of an aperture, etc.) of a camera lens and direct a motor to drive the camera lens based on these image capture parameters. For example, the camera lens may be pulled back and forth by the motor to adjust the focal length. The motor may be a step motor. The control component may control a current direction of one or more H-bridge circuits, which electrically connect with drive coils of the step motor, to pull back and forth the camera lens. However, the type of the stepper motor in different types of camera lenses may be different. To achieve same image capture parameters, the parameters or specification (e.g., the step number, the step size, the driving mode) of the stepper motors under the control of drive coils may be different. Therefore, the type of a camera lens has to be identified in order for the camera lens to be controlled in a manner matching its type. It is desirable to provide methods and systems for efficiently identifying the type of a camera lens.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

According to a first aspect of the present disclosure, an image device may include a camera lens; one or more stepper motors to drive the camera lens; one or more H-bridge circuits configured to control at least one of the one or more stepper motors; and a lens-identification circuit connected with the one or more H-bridge circuits, wherein the lens-identification circuit includes an impedance network of which an impedance value corresponds to a type of the camera lens.

In some embodiments, the impedance network may be positioned inside one of the one or more H-bridge circuits.

In some embodiments, if the one or more H-bridge circuits are multiple H-bridge circuits, the impedance network may be positioned between different H-bridge circuits.

In some embodiments, the different H-bridge circuits may control a same stepper motor of the one or more stepper motors or different stepper motors of the one or more stepper motors.

In some embodiments, the image device may also include a switching circuit to turn on or turn off the one or more H-bridge circuits and/or the lens-identification circuit.

In some embodiments, the lens-identification circuit may further include a fixed impedance that has a fixed impedance value and is in series with the impedance network, and a power source to provide a voltage to the fixed impedance and the impedance network.

In some embodiments, the impedance network may include at least one of a resistance, a capacitance, and an inductance.

In some embodiments, the impedance network may be positioned in the camera lens.

According to another aspect of the present disclosure, an image system may include an image device, one or more storage devices, and one or more processors configured to communicate with the one or more storage devices. The image device may include a camera lens; one or more stepper motors to drive the camera lens; one or more H-bridge circuits configured to control at least one of the one or more stepper motors; and a lens-identification circuit connected with the one or more H-bridge circuits, wherein the lens-identification circuit includes an impedance network of which an impedance value corresponds to a type of the camera lens. The one or more storage devices may include a set of instructions. When the one or more processors executing the set of instructions, the one or more processors may be directed to perform one or more of the following operations. The one or more processors may determine the impedance value of the impedance network. The one or more processors may obtain a predetermined relationship between the impedance value of the impedance network and the type of the camera lens. The one or more processors may determine the type of the camera lens based on the impedance value of the impedance network and the predetermined relationship between the impedance value of the impedance network and the type of the camera lens.

In some embodiments, the lens-identification circuit may further include a fixed impedance that has a fixed impedance value and is in series with the impedance network, and a power source. To determine the impedance value of the impedance network, the one or more processors may direct the power source to provide a voltage to the fixed impedance and the impedance network. The one or more processors may determine a voltage of the fixed impedance. The one or more processors may determine the impedance value of the impedance network based on a difference between the voltage provided by the power source and the determined voltage of the fixed impedance.

According to yet another aspect of the present disclosure, an image method may be implemented on a system including an image device, one or more processors, and one or more storage devices. The image device may include a camera lens; one or more stepper motors to drive the camera lens; one or more H-bridge circuits configured to control at least one of the one or more stepper motors; and a lens-identification circuit connected with the one or more H-bridge circuits, wherein the lens-identification circuit includes an impedance network of which an impedance value corresponds to a type of the camera lens. The method may include one or more of the following operations. The one or more processors may determine the impedance value of the impedance network. The one or more processors may obtain a predetermined relationship between the impedance value of the impedance network and the type of the camera lens. The one or more processors may determine the type of the camera lens based on the impedance value of the impedance network and the predetermined relationship between the impedance value of the impedance network and the type of the camera lens.

According to yet another aspect of the present disclosure, a system may include an image device, a detection module, and a determination module. The image device may include a camera lens; one or more stepper motors to drive the camera lens; one or more H-bridge circuits configured to control at least one of the one or more stepper motors; and a lens-identification circuit connected with the one or more H-bridge circuits, wherein the lens-identification circuit includes an impedance network of which an impedance value corresponds to a type of the camera lens. The detection module may be configured to determine the impedance value of the impedance network. The determination module may be configured to obtain a predetermined relationship between the impedance value of the impedance network and the type of the camera lens. The determination module may be also configured to determine the type of the camera lens based on the impedance value of the impedance network and the predetermined relationship between the impedance value of the impedance network and the type of the camera lens.

According to yet another aspect of the present disclosure, a non-transitory computer readable medium may comprise at least one set of instructions. The at least one set of instructions may be executed by one or more processors of a computer server including an image device. The image device may include a camera lens; one or more stepper motors to drive the camera lens; one or more H-bridge circuits configured to control at least one of the one or more stepper motors; and a lens-identification circuit connected with the one or more H-bridge circuits, wherein the lens-identification circuit includes an impedance network of which an impedance value corresponds to a type of the camera lens. The one or more processors may determine the impedance value of the impedance network. The one or more processors may obtain a predetermined relationship between the impedance value of the impedance network and the type of the camera lens. The one or more processors may determine the type of the camera lens based on the impedance value of the impedance network and the predetermined relationship between the impedance value of the impedance network and the type of the camera lens.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
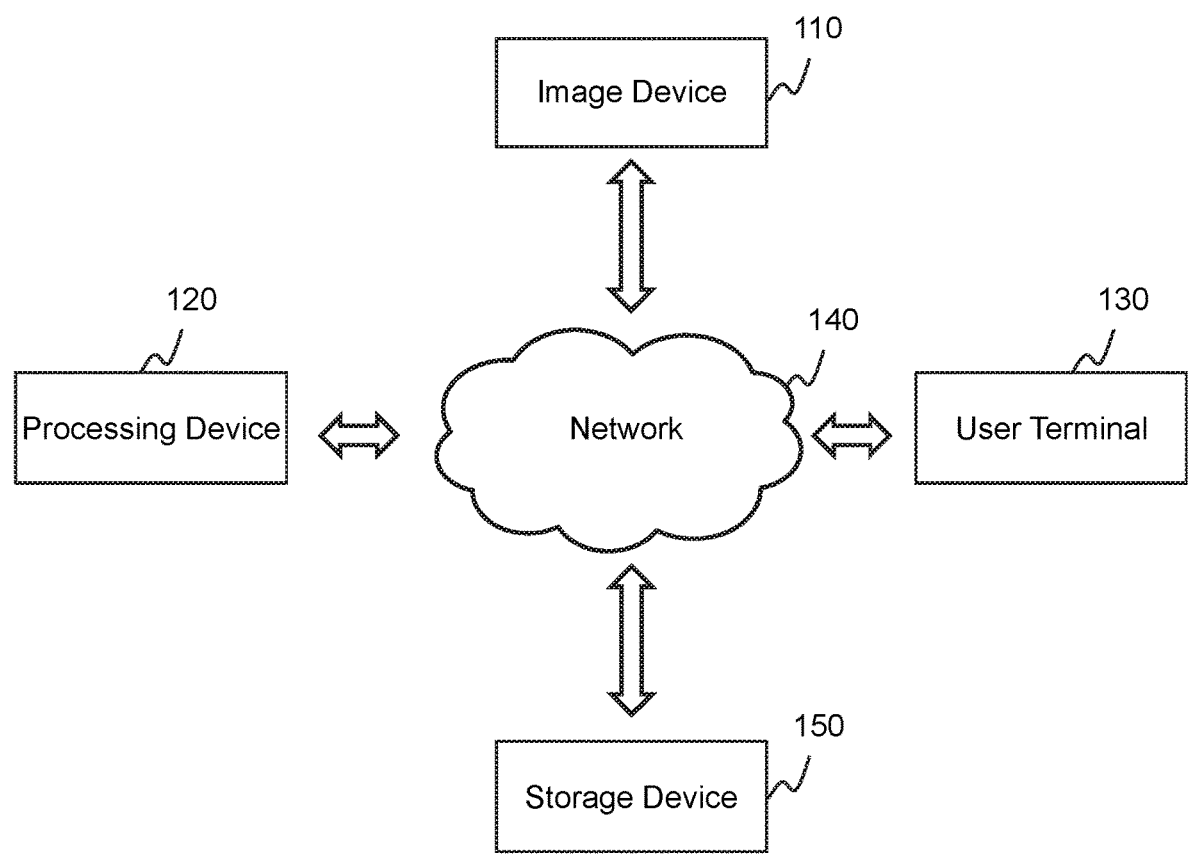
FIG. 1 is a schematic diagram illustrating an exemplary image capture system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, module, systems, devices, and/or drivers have been described at a relatively high-level, without detail, in order to avoid unnecessarily obscuring aspects of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "module," and/or "unit" used herein are one method to distinguish different components, elements, parts, section or assembly of different level in ascending order. However, the terms may be displaced by other expressions if they may achieve the same purpose.

It will be understood that when a device, unit, or module is referred to as being "on," "connected to," or "coupled to"

another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The disclosure is directed to a camera lens. In existing image devices (e.g., a camera), a camera lens prevalently includes integrated circuit (IC) components, such as an IC component with read-only memory (ROM) structure. Focus parameters and exposure parameters associated with the camera lens are stored in the ROM. The ROM communicates with the DSP of the image device through a communication bus and a transceiver. The DSP accesses the ROM to read the focus parameters and the exposure parameters associated with the camera lens. The DSP may identify the type of the camera lens and control the camera lens based on the focus parameters and the exposure parameters. In some other existing image devices, a camera lens may include Hall components to identify the type of the camera lens. Including Hall components in the structural design achieve the identification of the camera lens type. However, including IC or a Hall may increase the complexity and production cost of a camera lens and in the meantime, reduce its compatibility.

To resolve these problems, in the present disclosure, a camera lens may include at least one impedance network with an impedance value corresponding to the type of the camera lens. The type of the camera lens may be identified by determining the impedance value of the at least one impedance network. The at least one impedance network may be positioned inside an H-bridge circuit or be positioned between different H-bridge circuits. By adding at least one impedance network inside the camera lens to identify the type of the camera lens, the cost in the production of the camera lens may be relatively lower. Because the at least one impedance network is positioned inside an H-bridge circuit or is positioned between different H-bridge circuits, without changing the sequence of signal lines or adding extra signal lines on the interface of the camera lens, the design of the camera lens is simplified and the compatibility of the camera lens is enhanced.

FIG. 1 is a schematic diagram illustrating an exemplary image capture system 100 according to some embodiments of the present disclosure. As illustrated in FIG. 1, the image capture system 100 may include an image device 110, a processing device 120, a user terminal 130, a network 140, and a storage device 150.

The image device 110 may be configured to capture images or videos. The images or videos may be two-dimensional (2D) or three-dimensional (3D). In some embodiments, the image device 110 may include a digital camera. The digital camera may include a 2D camera, a 3D camera, a panoramic camera, a virtual reality (VR) camera, a web camera, an instant picture camera, a video camera, a surveillance camera, or the like, or any combination thereof. In some embodiments, the image device 110 may include a stereo camera. The stereo camera may include a binocular vision device or a multi-camera. In some embodiments, the image device 110 may be added to or be part of a medical imaging equipment, a night-vision equipment, a radar equipment, a sonar equipment, an electronic eye, a camcorder, a thermal imaging equipment, a smartphone, a tablet PC, a laptop, a wearable equipment (e.g., 3D glasses), an eye of a robot, a vehicle traveling data recorder, an unmanned device (e.g., an unmanned aerial vehicle (UAV), a driverless car, etc.), a video gaming console, or the like, or any combination thereof.

In some embodiments, the image device 110 may communicate with one or more components (e.g., the user terminal 130, the processing device 120, or the storage device 150) of the image device 100 via the network 140. In some embodiments, the image device 110 may be directly connected to the one or more components (e.g., the user terminal 130, the processing device 120, or the storage device 150) of the image device 100.

The processing device 120 may process information and/or data to perform one or more functions described in the present disclosure. For example, the processing device 120 may identify the type of a camera lens (e.g., the camera lens 112) of the image device 110. As another example, the processing device 120 may transmit control signals to a camera lens (e.g., the camera lens 112) of the image device 110 to drive the camera lens.

In some embodiments, the processing device 120 may be a single server or a server group. The server group may be centralized, or distributed (e.g., the processing device 120 may be a distributed system). In some embodiments, the processing device 120 may be local or remote. For example, the processing device 120 may access/transmit information and/or data in/to the image device 110, the user terminal 130, or the storage device 150 via the network 140. As another example, the processing device 120 may be directly connected to the image device 110, the user terminal 130, or the storage device 150 to access/transmit information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented on a computing device 200 having one or more components illustrated in FIG. 2 in the present disclosure.

In some embodiments, the processing device 120 may include one or more processing engines (e.g., single-core processing engine(s) or multi-core processor(s)). Merely by way of example, the processing device 120 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof. In some embodiments, the processing device 120 may be part of the image device 110 or the user terminal 130.

The user terminal 130 may receive/transmit data and/or information from the image device 110, the processing device 120, and/or the storage device 150. For example, the user terminal 130 may receive images and/or videos from the image device 110. As another example, the user terminal 130 may transmit instructions to the image device 110 and/or the processing device 120.

The user terminal 130 may include a mobile device, a tablet computer, a laptop computer, or the like, or any combination thereof. In some embodiments, the mobile device may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™.

In some embodiments, the user terminal 130 may communicate with one or more components (e.g., the image device 110, the processing device 120, or the storage device 150) of the image capture system 100 via the network 140. In some embodiments, the user terminal 130 may be directly connected to the one or more components (e.g., the image device 110, the processing device 120, or the storage device 150) of the image capture system 100. In some embodiments, the user terminal 130 may be part of the image device 110 and/or the processing device 120.

The network 140 may be configured to facilitate communications among the components (e.g., the image device 110, the user terminal 130, the processing device 120, and the storage device 150) of the image capture system 100. For example, the network 140 may transmit digital signals from the image device 110 to the processing device 120. As another example, the network 140 may transmit images generated by the image device 110 to the storage device 150.

In some embodiments, the network 140 may include a wired network, a wireless network, or any connection capable of transmitting and receiving data. In some embodiments, the wired network may include a connection using a metal cable, an optical cable, a hybrid cable, or the like, or any combination thereof. In some embodiments, the wireless network may include a near field communication (NFC), a body area network (BAN), a personal area network (PAN), e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof.

The storage device 150 may be configured to store data and/or instructions. In some embodiments, the storage device 150 may store data obtained from the processing device 120 and/or the image device 110. For example, the storage device 150 may store images captured by the image device 110. In some embodiments, the storage device 150 may store data and/or instructions that the processing device 120 may execute or use to perform exemplary methods described in the present disclosure. For example, the storage device 150 may store instructions that the processing device 120 may execute to identify the type of a camera lens (e.g., the camera lens 112). In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 140 to communicate with one or more components in the image capture system 100 (e.g., the image device 110, the user terminal 130, and the processing device 120). One or more components in the image capture system 100 may access the data or instructions stored in the storage device 150 via the network 140. In some embodiments, the storage device 150 may be directly connected to or communicate with one or more components in the image capture system 100 (e.g., the image device 110, the user terminal 130, and the processing device 120). In some embodiments, the storage device 150 may be part of the image device 110, the user terminal 130, and/or the processing device 120.

In some embodiments, two or more components of the image capture system 100 may be integrated in one device. For example, the image device 110, the processing device 120, and the storage device 150 may be integrated in one device (e.g., a camera, a smartphone, a laptop, a workstation, a server, etc.). In some embodiments, one or more components of the image capture system 100 may be located remotely from other components. For example, the image device 110 may be installed at a location away from the processing device 120, which may be implemented in a single device together with the storage device 150.

It should be noted that the component of the image capture system 100 illustrated in FIG. 1 may be implemented via various ways. For example, the components may be implemented through hardware, software, or a combination thereof. Herein, the hardware may be implemented by a dedicated logic; the software may be stored in the storage, the system may be executed by proper instructions, for example, by a microprocessor or a dedicated design hardware. Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or in a data carrier such as optical signal carrier or electric signal carrier. The systems and the methods in the present application may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

Figure 2:
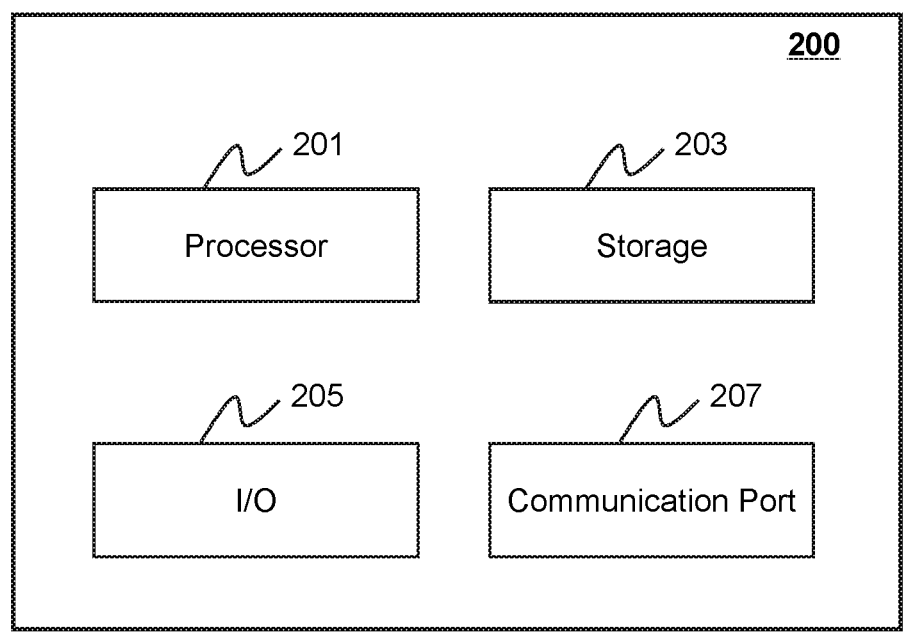
FIG. 2 is a schematic diagram illustrating exemplary hardware and software components of a computing device according to some embodiments of the present disclosure.

FIG. 2 is a schematic diagram illustrating exemplary hardware and/or software components of a computing device on which the image device 110, the user terminal 130, and/or the processing device 120 may be implemented according to some embodiments of the present disclosure. As illustrated in FIG. 2, the computing device 200 may include a processor 201, a storage 203, an input/output (I/O) 205, and a communication port 207.

The processor 201 may execute computer instructions (program code) and perform functions of the processing device in accordance with techniques described herein. The computer instructions may include routines, programs, objects, components, signals, data structures, procedures, modules, and functions, which perform particular functions described herein. For example, the processing device 120 may be implemented on the computing device 200 and the processor 201 may identify the type of a camera lens (e.g., the camera lens 112). In some embodiments, the processor 201 may include a microcontroller, a microprocessor, a reduced instruction preset computer (RISC), an application specific integrated circuits (ASICs), an application-specific instruction-preset processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 200. However, it should be note that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., a first processor executes step A and a second processor executes step B, or the first and second processors jointly execute steps A and B).

The storage 203 may store data/information obtained from any other component of the computing device 200 (e.g., the processor 201). In some embodiments, the storage 203 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random-access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for identifying the type of a camera lens. As another example, the storage 203 may store images captured by the image device 110.

The I/O 205 may input or output signals, data, or information. In some embodiments, the I/O 205 may enable a user interaction with the processing device. For example, a captured image may be displayed through the I/O 205. In some embodiments, the I/O 205 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 207 may be connected to a network to facilitate data communications. The communication port 207 may establish connections between the computing device 200 (e.g., the capture device 100) and an external device (e.g., a smart phone). The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 207 may be a standardized communication port, such as RS232, RS485, etc.

Figure 3:
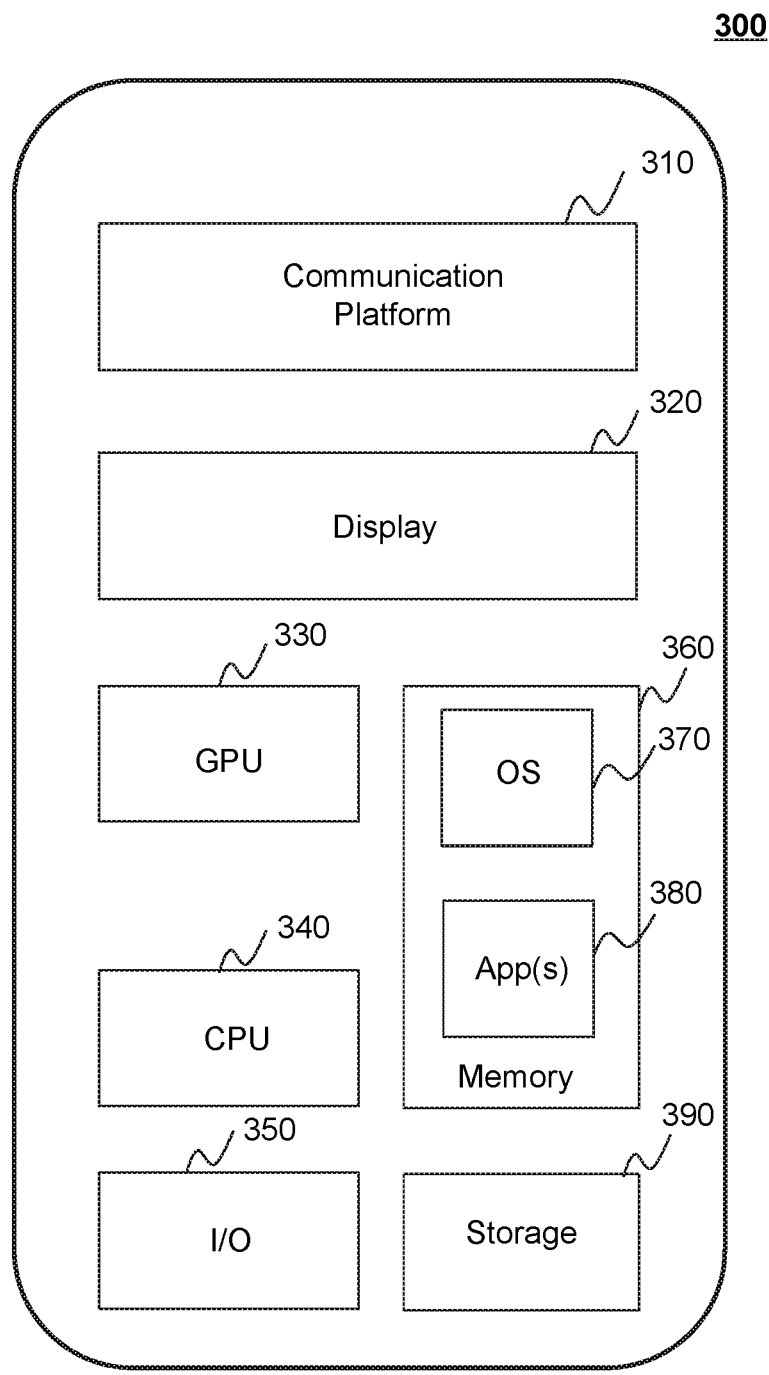
FIG. 3 is a schematic diagram illustrating exemplary hardware and software components of a mobile device according to some embodiments of the present disclosure.

FIG. 3 is a schematic diagram illustrating exemplary hardware and/or software components of a mobile device on which the image device 110, the user terminal 130, or the processing device 120 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 (e.g., a taxi-hailing application) may include a browser or any other suitable mobile apps for receiving and rendering information relating to transportation services or other information from the processing device 120. User interactions with the information stream may be achieved via the I/O 350 and provided to the processing device 120 and/or other components of the speed prediction system 100 via the network 140. Merely by way of example, a road feature transmit to a service requester may be displayed in the user terminal 140 through the display 320. As another example, a service provider may input an image related to a road segment through the I/O 350.

Hence, aspects of the methods of the image processing and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution (e.g., an installation on an existing server). In addition, image processing as disclosed herein may be implemented as firmware, a firmware/software combination, a firmware/hardware combination, or a hardware/firmware/software combination.

For brevity, the description of the image device 110 below may take an image device including one camera lens as an example. It should be noted that the image device 110 below is merely some examples or implementations. For persons having ordinary skills in the art, the image device 110 in the present disclosure may be applied to other similar situations, such as an image device including more than one camera lens.

Figure 4:
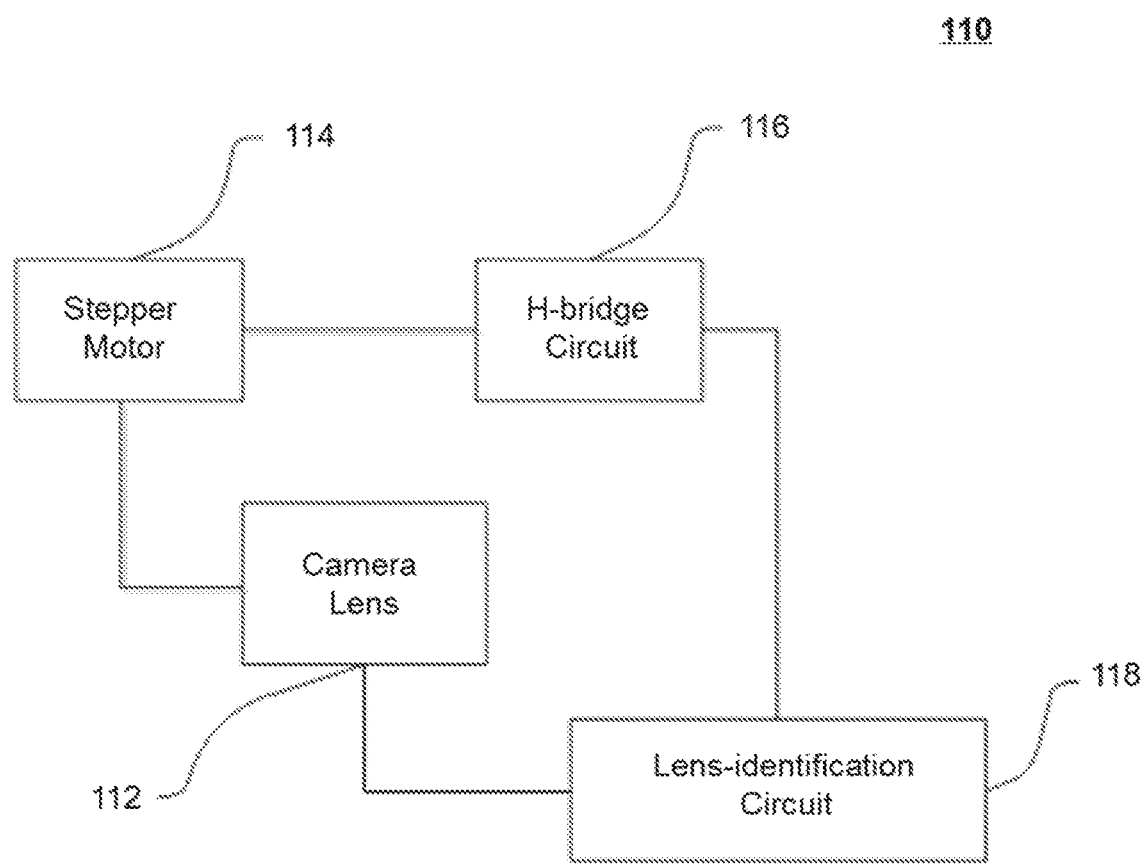
FIG. 4 is a schematic diagram illustrating an exemplary image device according to some embodiments of the present disclosure.

FIG. 4 is a schematic diagram illustrating an exemplary image device according to some embodiments of the present disclosure. As shown in FIG. 4, the image device 110 may include a camera lens 112, one or more stepper motors 114, one or more H-bridge circuits 116, and a lens-identification circuit 118.

In some embodiments, the camera lens 112 may be an optical device that focuses light by means of refraction to form an image. The camera lens 112 may be configured to catch scenes it is facing at. The camera lens 112 may include one or more optical lenses and aperture mechanisms to adjust its aperture. An aperture of the camera lens 112 may refer to the size of the hole through which light passes to reach a photographic film or other media capable of storing an image chemically or electronically. The aperture may be adjustable to adjust the amount of light that passes through the camera lens 112. The focal length of the camera lens 112 may be fixed or may be adjustable to adjust the coverage of the image device 110. The focal length of the camera lens 112 may be adjusted by moving the one or more optical lenses. In some embodiments, the camera lens 112 may be an electric camera lens or a mechanical camera lens. The camera lens 112 may be permanently fixed to the image device 110 or be detachable from the image device 110.

In some embodiments, the one or more stepper motors 114 may drive the camera lens 112 to realize zoom (e.g., adjusting the focal length) and/or focus. For example, the camera lens 112 may be pulled back and forth when the one or more stepper motors 114 move the optical lenses in the camera lens 112 to realize zoom and/or focus. As another example, the one or more stepper motors 114 may control the aperture mechanisms to adjust the aperture of the camera lens 112. The one or more stepper motors 114 may be controlled by the one or more H-bridge circuits 116. In some embodiments, each of the one or more stepper motors 114 may be controlled by at least one of the one or more H-bridge circuits 116. In some embodiments, one of the one or more H-bridge circuits 116 may control one of the one or more stepper motors 114. Merely by way of example, the image device 110 may include two stepper motors 114 and at least two H-bridge circuits 116. As another example, a stepper motor may include at least one drive coil. Each drive coil may be controlled by an H-bridge circuit. As still another example, the image device 110 may include two stepper motors 114 each of which has two drive coils. The image device 110 may include 4 H-bridge circuits 116 to control the two stepper motors 114. In some embodiments, the one or more stepper motors 114 may be positioned inside or outside the camera lens 112. In some embodiments, if there are more than one stepper motor 114 in the image device 110, the more than one stepper motor 114 (e.g., the types) may be same or different.

In some embodiments, the lens-identification circuit 118 may be configured to determine the type of the camera lens 112. In some embodiments, the lens-identification circuit 118 may connect to at least one of the one or more H-bridge circuits 116 or may not connect to the one or more H-bridge circuits 116.

Figure 5:
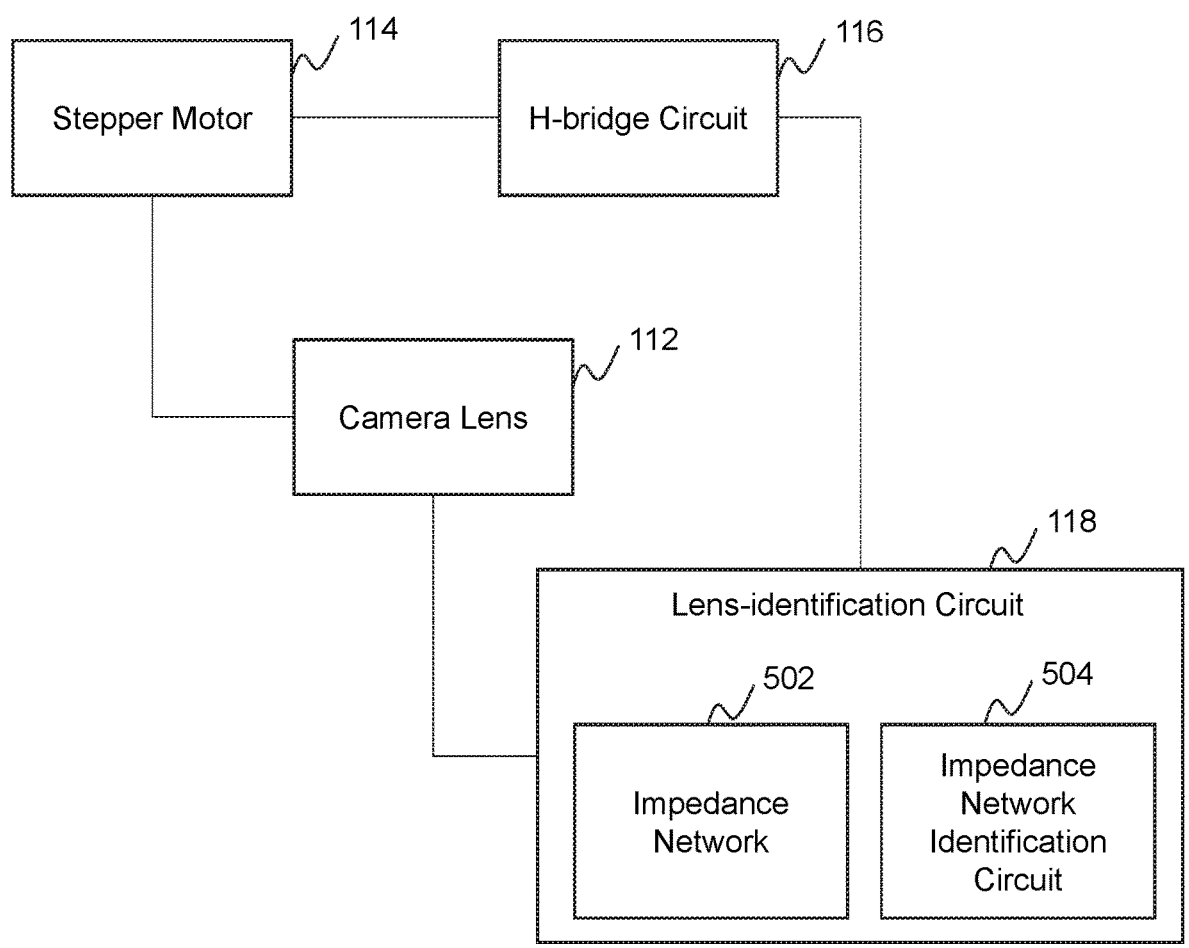
FIG. 5 is a schematic diagram illustrating an exemplary image device according to some embodiments of the present disclosure.

In some embodiments, as shown in FIG. 5, the lens-identification circuit 118 may include one or more impedance networks 502 and one or more impedance network identification circuits 504. The one or more impedance values of the one or more impedance networks 502 may correspond to the type of the camera lens 112. In some embodiments, the impedance values of the impedance networks corresponding to different types of camera lenses may be different. Accordingly, the type of the camera lens 112 may be identified by determining the one or more impedance values of the one or more impedance networks 502. In some embodiments, the one or more impedance networks 502 may be positioned inside the camera lens 112. The one or more impedance networks 502 may include a resistance, a capacitance, an inductance, or the like, or any combination thereof.

In some embodiments, in the case that the lens-identification circuit 118 connects to at least one of the one or more H-bridge circuits 116, the impedance network 502 may be positioned inside one of the one or more H-bridge circuits 116. Alternatively, the impedance network 502 may be positioned outside the one or more H-bridge circuits 116. Further, if the one or more H-bridge circuits 116 are multiple H-bridge circuits, the impedance network 502 may connect with two different H-bridge circuits. The two different H-bridge circuits may control a same stepper motor or two different stepper motors. For example, the camera lens 112 may include two stepper motors 114 each of which has two drive coils. The four drive coils of the two stepper motors 114 may be controlled by 4 H-bridge circuits 116. Each of the 4 H-bridge circuits 116 may output 2 signals to control a drive coil. The lens camera may include at least one (e.g., 1-4) impedance network 502 each of which connects to two signals from different H-bridge circuits, respectively.

In some embodiments, if there is more than one impedance network 502 in the camera lens 112, the impedance values of the impedance networks 502 may be same or different.

In some embodiments, because the at least one impedance network 502 connects with the one or more H-bridge circuits 116, without changing the sequence of signal lines or adding extra signal lines in the interface of the camera lens 112, the design of the camera lens 112 is simplified and the compatibility of the camera lens 112 is enhanced.

In some embodiments, the more impedance networks the camera lens includes, the more types of camera lens can be identified. For example, a camera lens may include two stepper motors each of which has two drive coils. The four drive coils of the two stepper motors may be controlled by 4 H-bridge circuits. The lens camera may include 1-4 impedance networks each of which connects to two different H-bridge circuits. If there are 6 kinds of impedance networks with 6 impedance values, and only one impedance network is positioned in each camera lens, with this design, 6 types of camera lenses can be identified based on the 6 impedance values. Similarly, if four impedance networks are positioned in each camera lens, with this design, $6^4$ types of camera lenses can be identified based on different combination of 4 impedance values in each camera lens.

In some embodiments, one impedance network identification circuit 504 may be configured to determine the impedance value of at least one impedance network 502. The impedance network identification circuit 504 may include a fixed impedance that has a fixed impedance value and is in series or in parallel with the impedance network 502, and a power source to provide a voltage to the fixed impedance and the impedance network 502. In some embodiments, the fixed impedance value of the fixed impedance may be constant for different types of camera lenses. In some embodiments, the fixed impedance value may be known and be stored in a storage medium (e.g., the storage device 150, the storage 220, the storage 390, the memory 360, etc.) of the image capture system 100. For example, the fixed impedance value may be stored in a device used to identify the type of the camera lens 112, such as the processing device 120 (e.g., a DSP chip). The fixed impedance may include a resistance, a capacitance, an inductance, or the like, or any combination thereof. The fixed impedance and/or the power source may be positioned inside or outside the camera lens 112.

In some embodiments, the impedance value of the one or more impedance networks 502 may be determined by the one or more impedance network identification circuits 504 one by one or simultaneously.

Figure 6:
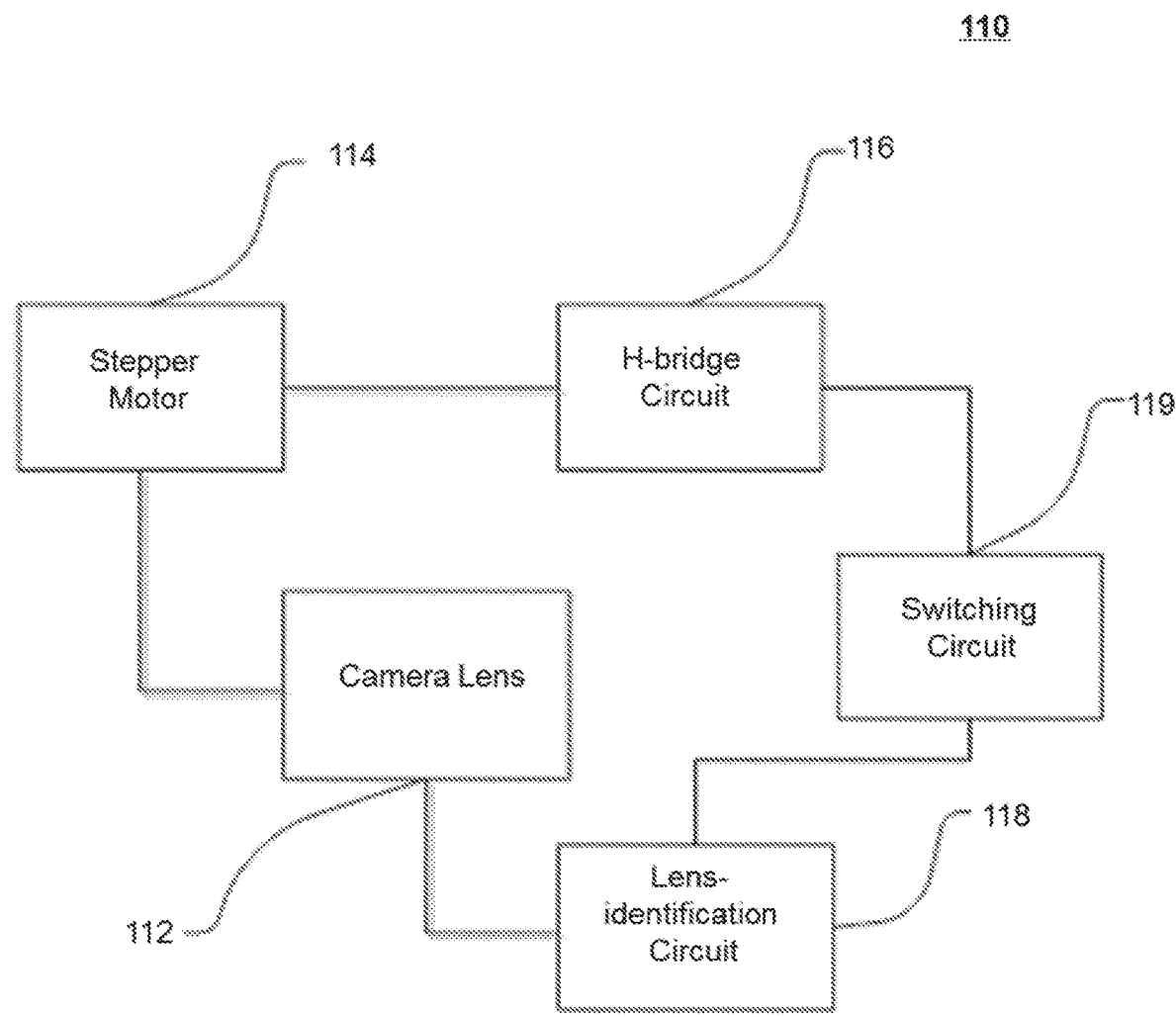
FIG. 6 is a schematic diagram illustrating an exemplary image device according to some embodiments of the present disclosure.

In some embodiments, as shown in FIG. 6, the image device 110 may further include a switching circuit 119. The switching circuit 119 may be configured to turn on or turn off the one or more H-bridge circuits 116 and/or the lens-identification circuit 118. The switching circuit 119 may include one or more switches. The switches may be any component having a function for turning on and turning off a circuit. For example, the switch may include a single-pole-single-throw (SPST) switch, a single-pole-double-throw (SPDT) switch, a metal oxide semiconductor (MOS) switch, a transistor, or the like, or any combination thereof.

In some embodiments, when the one or more H-bridge circuits 116 control the one or more stepper motors 114 to drive the camera lens 112, the switching circuit 119 may turn on the one or more H-bridge circuits 116 whiles turn off the lens-identification circuit 118, which may avoid the interference, from the lens-identification circuit 118, in the one or more H-bridge circuits 116. When the lens-identification circuit 118 is working to identify the type of the camera lens 112, the switching circuit 119 may turn on the lens-identification circuit 118 and turn off the one or more H-bridge circuits 116, which may avoid the interference, from the one or more H-bridge circuits 116, in the lens-identification circuit 118.

In some embodiments, if one impedance network identification circuit 504 corresponds to more than one impedance network 502, in order to determine the impedance value of one of the more than one impedance network 502, the switching circuit 119 may connect the impedance network identification circuit 504 with the impedance network 502 and disconnect the impedance network identification circuit 504 with the rest of the more than one impedance network 502.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the stepper motor 114 in the image device 110 may be replaced by other suitable motors, such as a direct-current motor.

Figure 7:
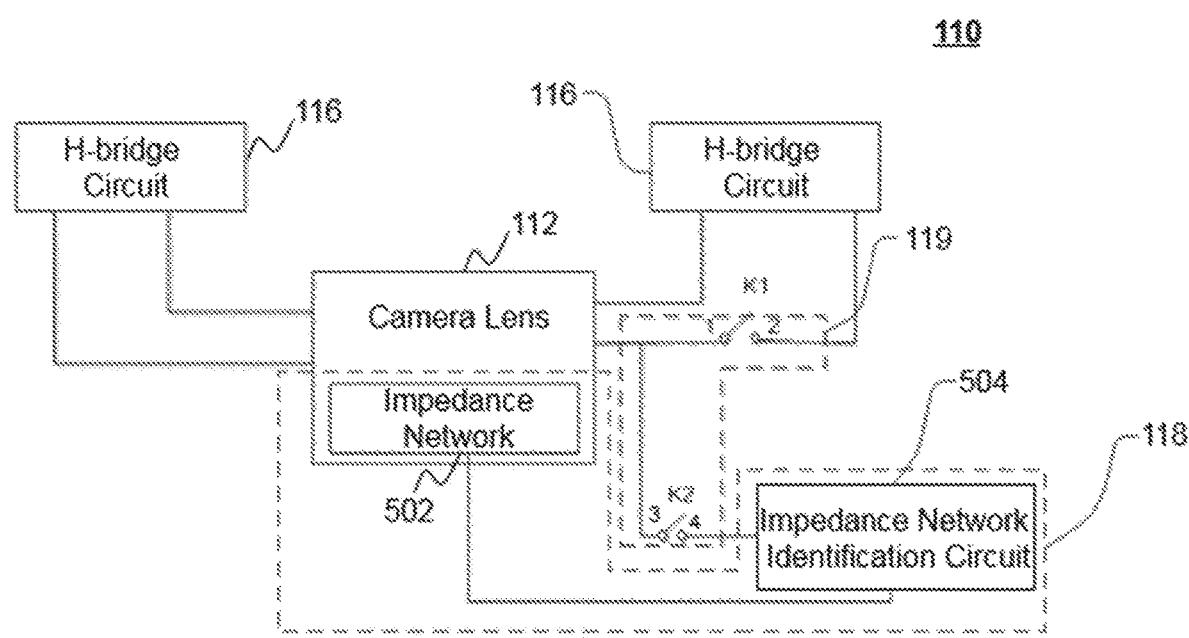
FIG. 7 is a schematic diagram illustrating an exemplary image device including a switching circuit with single-pole-single-throw (SPST) switches according to some embodiments of the present disclosure.

FIG. 7 is a schematic diagram illustrating an exemplary image device including a switching circuit with SPST switches according to some embodiments of the present disclosure. As shown in FIG. 7, in this embodiment, the image device 110 may include at least two H-bridge circuits 116. The lens-identification circuit 118 may include at least one impedance network 502 and at least one impedance network identification circuit 504. The at least one impedance network 502 may be positioned inside the camera lens 112 and be positioned between two of the at least two H-bridge circuits 116. The two of the at least two H-bridge circuits 116 may control a same stepper motor or control different stepper motors.

As shown in FIG. 7, the switching circuit 119 may include two SPST switches K1 and K2. When the H-bridge circuits 116 control the one or more stepper motors 114 driving the camera lens 112, K1 may be signaled to connect with the H-bridge circuits 116 (e.g., K1 may be controlled to connect with point 2 in FIG. 7) while K2 may be signaled to disconnect with the lens-identification circuit 118 (e.g., K2 may be signaled to disconnect with point 4 in FIG. 7), so as to turn on the H-bridge circuits 116 and turn off the lens-identification circuit 118, which may avoid the interference of the lens-identification circuit 118 in the H-bridge circuits 116. When the lens-identification circuit 118 is working to identify the type of the camera lens 112, K1 may be signaled to disconnect with the H-bridge circuit 116 (e.g., K1 may be controlled to disconnect with point 2 in FIG. 7) while K2 may be signaled to connect with the lens-identification circuit 118 (e.g., K2 may be controlled to connect with point 4 in FIG. 7), so as to turn on the lens-identification circuit 118 and turn off the H-bridge circuits 116, which may avoid the interference of the H-bridge circuits 116 in the lens-identification circuit 118.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, K1 and K2 may be replaced by a SPDT switch.

Figure 8:
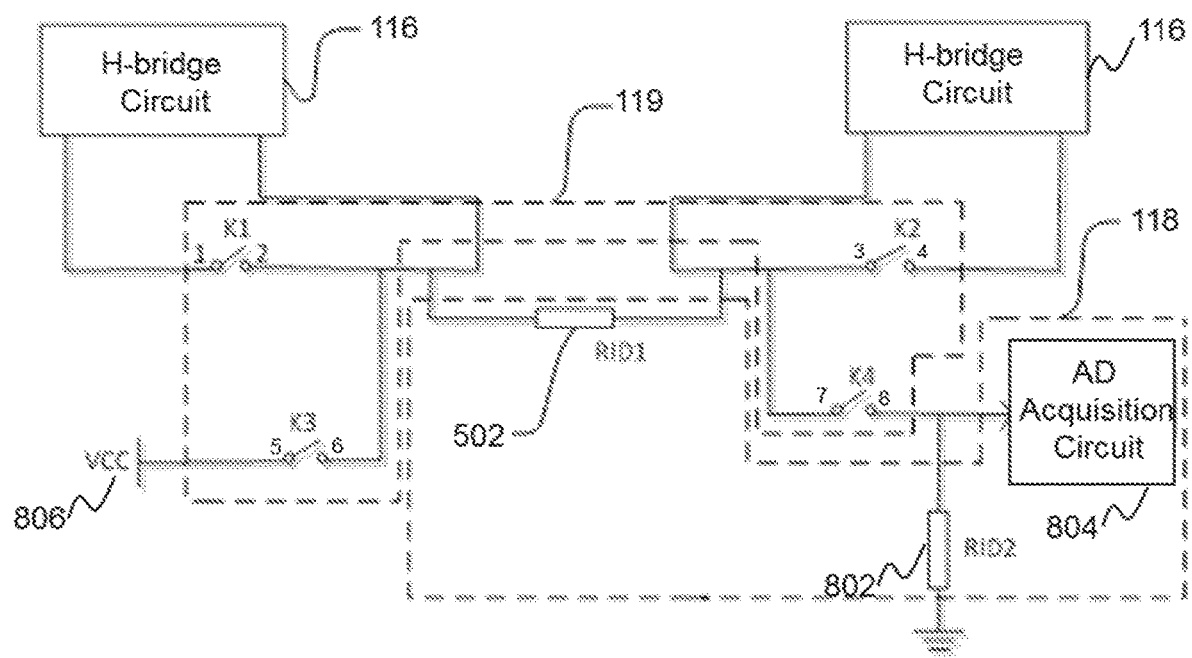
FIG. 8 is a schematic diagram illustrating an exemplary image device including a switching circuit with SPST switches according to some embodiments of the present disclosure.

FIG. 8 is a schematic diagram illustrating an exemplary image device including a switching circuit with SPST switches according to some embodiments of the present disclosure. As shown in FIG. 8, in this embodiment, the image device 110 may include at least two H-bridge circuits 116. The lens-identification circuit 118 may include the impedance network 502 (e.g., a resistance RID1 shown in FIG. 8), a fixed impedance 802 (e.g., a resistance RID2 shown in FIG. 8), an Analog-Digital (AD) acquisition circuit 804, and a power source 806 (e.g., a volt current condenser (VCC) shown in FIG. 8). The impedance network 502 may be positioned between two of the at least two H-bridge circuits 116. The two of the at least two H-bridge circuits 116 may control a same stepper motor or control different stepper motors.

As shown in FIG. 8, the switching circuit 119 may include four SPST switches K1, K2, K3, and K4. When the H-bridge circuits 116 control the one or more stepper motors 114 to drive the camera lens 112, K1 and K2 may be controlled to connect with the H-bridge circuits 116 (e.g., K1 may be controlled to connect with point 2 in FIG. 8 and K2 may be controlled to connect with point 4 in FIG. 8), and K3 and K4 may be controlled to disconnect with the lens-identification circuit 118 (e.g., K3 may be controlled to disconnect with point 6 in FIG. 8 and K4 may be controlled to disconnect with point 8 in FIG. 8), so as to turn on the H-bridge circuits 116 while turn off the lens-identification circuit 118, which may avoid the interference of the lens-identification circuit 118 in the H-bridge circuits 116. When the lens-identification circuit 118 is working to identify the type of the camera lens 112, K1 and K2 may be controlled to disconnect with the H-bridge circuits 116 (e.g., K1 may be controlled to disconnect with point 2 in FIG. 8 and K2 may be controlled to disconnect with point 4 in FIG. 8), while K3 and K4 may be controlled to connect with the lens-identification circuit 118 (e.g., K3 may be controlled to connect with point 6 in FIG. 8 and K4 may be controlled to connect with point 8 in FIG. 8), so as to turn on the lens-identification circuit 118 and in the meantime, turn off the H-bridge circuits 116, which may avoid the interference of the H-bridge circuits 116 in the lens-identification circuit 118. It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the AD acquisition circuit 804 may be part of the processing device 120. As another example, K2 and K4 may be replaced by a SPDT switch. As a further example, K1 and K3 may be replaced by a SPDT switch. As still another example, an extra impedance network 502 (not shown in FIG. 8) may be also positioned between two of the at least two H-bridge circuits 116.

Figure 9:
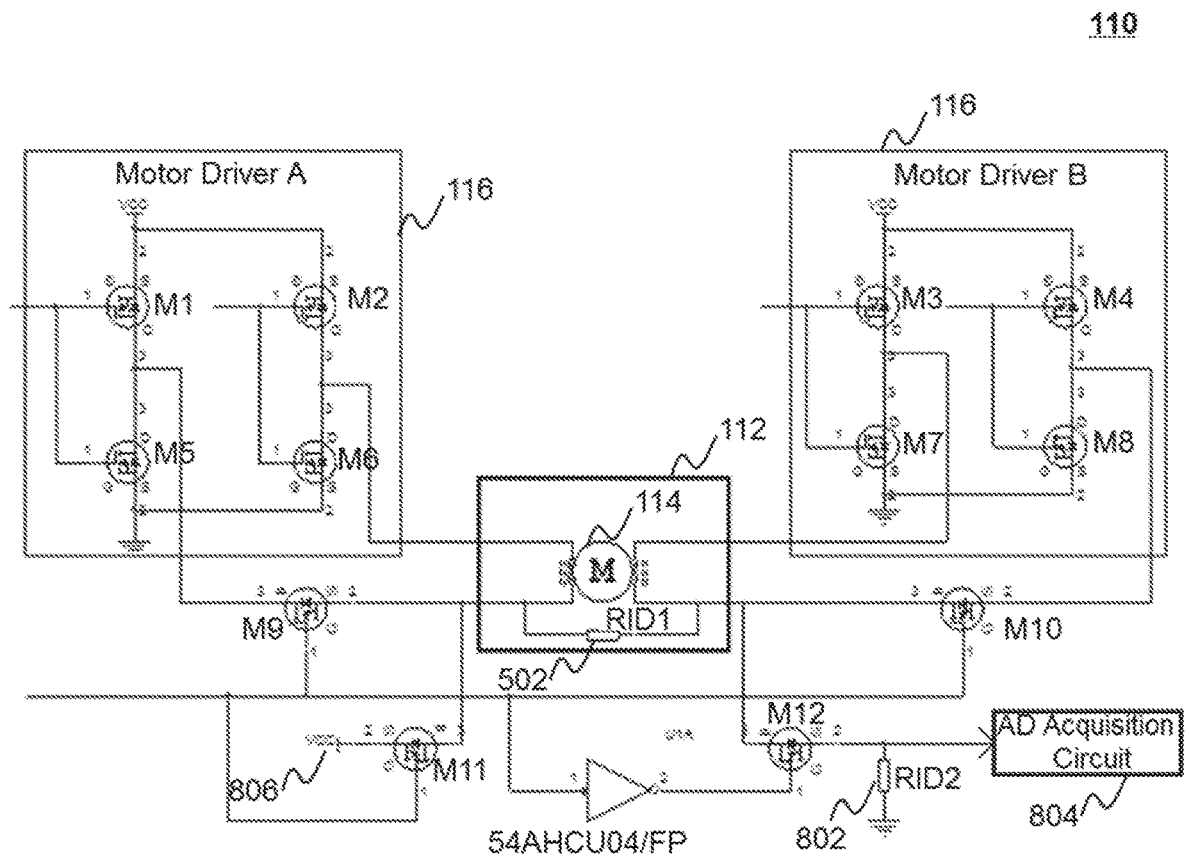
FIG. 9 is a schematic diagram illustrating an exemplary image device including a switching circuit with MOS switches according to some embodiments of the present disclosure.

FIG. 9 is a schematic diagram illustrating an exemplary image device including a switching circuit with MOS switches according to some embodiments of the present disclosure. As shown in FIG. 9, in this embodiment, the image device 110 may include at least two motor drivers configured to control the stepper motor 114. The motor driver may include the H-bridge circuit 116. For example, the H-bridge circuit 116 in motor driver A may include four MOS switches M1, M2, M5, and M6. The H-bridge circuit 116 in motor driver B may include four MOS switches M3, M4, M7, and M8. As shown in FIG. 9, the stepper motor 114 may be positioned inside the camera lens 112.

The lens-identification circuit 118 may include the impedance network 502 (e.g., a resistance RID1 shown in FIG. 9), a fixed impedance 802 (e.g., a resistance RID2 shown in FIG. 9), an AD acquisition circuit 804, an amplifier (e.g., an amplifier 54AHCU04/FP in FIG. 9), and a power source 806. The impedance network 502 may be positioned in the camera lens 112 and be positioned between two H-bridge circuits 116 used to control the stepper motor 114, without changing the sequence of signal lines or adding extra signal lines in the interface of the camera lens 112, which makes the design of the camera lens 112 simplified and the compatibility of the camera lens 112 relatively higher.

As shown in FIG. 9, the switching circuit 119 may include four MOS switches M9, M10, M11, and M12. When the H-bridge circuits 116 control the stepper motor 114 to drive the camera lens 112, M11 and M12 may be controlled to disconnect with the lens-identification circuit 118, while M9 and M10 may be controlled to connect with the H-bridge circuits 116, so as to turn on the H-bridge circuits 116 and turn off the lens-identification circuit 118, which may avoid the interference of the lens-identification circuit 118 in the H-bridge circuits 116. When the lens-identification circuit 118 is working to identify the type of the camera lens 112, M11 and M12 may be controlled to connect with the lens-identification circuit 118, while M9 and M10 may be controlled to disconnect with the H-bridge circuits 116, so as to turn on the lens-identification circuit 118 and turn off the H-bridge circuits 116, which may avoid the interference of the H-bridge circuits 116 in the lens-identification circuit 118.

In some embodiments, if M1 and M2 connect with the H-bridge circuit 116 in motor driver A at the same time and M5 and M6 disconnect with the H-bridge circuit 116 in motor driver A at the same time, M9 and M11 may be omitted.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, an extra impedance network 502 (not shown in FIG. 9) may be also positioned between the two H-bridge circuits 116.

Figure 10:
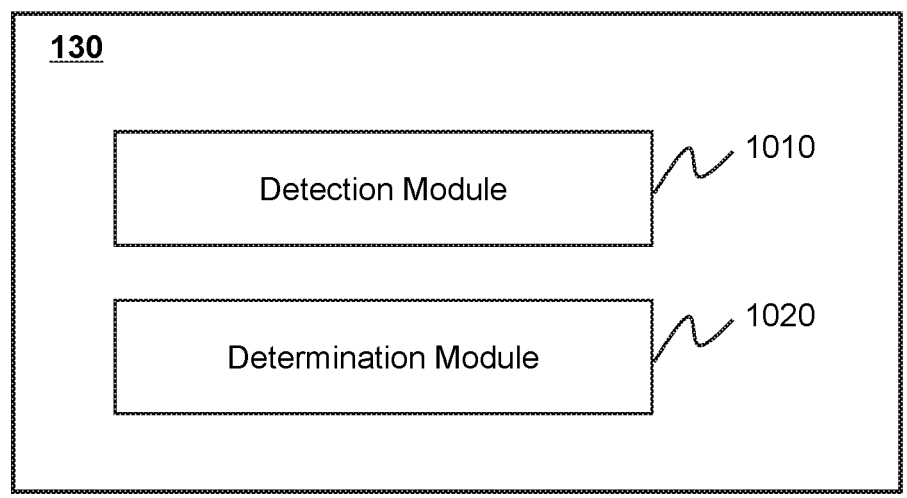
FIG. 10 is a schematic diagram illustrating an exemplary processing device according to some embodiments of the present disclosure.

FIG. 10 is a schematic diagram illustrating an exemplary processing device according to some embodiments of the present disclosure. The processing device 120 may include a detection module 1010 and a determination module 1020.

The detection module 1010 may be configured to determine an impedance value of the impedance network 502. For example, as shown in FIG. 8 and/or FIG. 9, the AD acquisition circuit 804 may detect the voltage of the fixed impedance 802 and transmit the voltage of the fixed impedance 802 to the detection module 1010. The detection module 1010 may determine the impedance value of the impedance network 502 based on the voltage provided by the power source 806, the voltage of the fixed impedance 802, and the fixed impedance value of the fixed impedance 802. Details regarding determining the impedance value of the impedance network 502 may be found elsewhere in the present disclosure (e.g., the description in connection with FIG. 12).

The determination module 1020 may be configured to obtain a predetermined relationship between the impedance value of the impedance network and a type of the camera lens. In some embodiments, the predetermined relationship may be stored in a storage medium (e.g., the storage device 150, the storage 220, the storage 390, the memory 360, etc.) of the image capture system 100. For example, the predetermined relationship may be stored in a device used to identify the type of the camera lens 112, such as the processing device 120 (e.g., a DSP chip).

The determination module 1020 may be further configured to determine the type of the camera lens 112 based on the impedance value of the impedance network 502 and the predetermined relationship between the impedance value of the impedance network 502 and the type of the camera lens 112.

The modules in the processing device 120 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the determination module 410 may be divided into two units. A first unit may obtain the predetermined relationship between the impedance value of the impedance network and the type of the camera lens. A second unit may determine the type of the camera lens.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 120 may further include a storage module (not shown in FIG. 4). The storage module may be configured to store data generated during any process performed by any component of in the processing device 120. As another example, each of components of the processing device 120 may correspond to a storage module, respectively. Additionally or alternatively, the components of the processing device 120 may share a common storage module.

Figure 11:
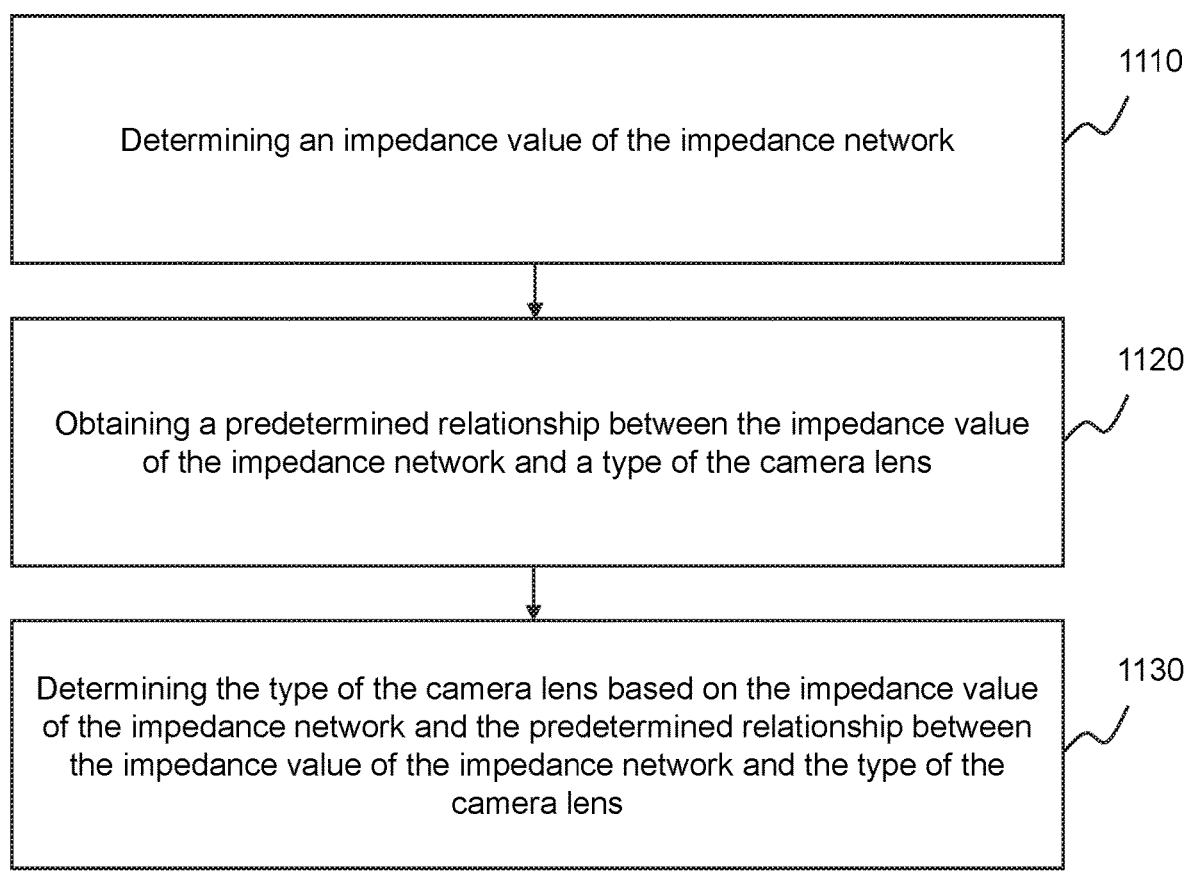
FIG. 11 is a flowchart illustrating an exemplary process for determining a type of a camera lens according to some embodiments of the present disclosure.

FIG. 11 is a flowchart illustrating an exemplary process for determining a type of a camera lens according to some embodiments of the present disclosure. In some embodiments, the process 1100 may be implemented in the image capture system 100 illustrated in FIG. 1. For example, the process 1100 may be stored in a storage medium (e.g., the storage device 150, the storage 220, the memory 360, or the storage 390) as a form of instructions, and can be invoked and/or executed by the processing device 120 (e.g., the processor 210, the CPU 340, or one or more modules in the processing device 120 illustrated in FIG. 10). The operations of the illustrated process 1100 presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting.

In some embodiments, the process 1100 for identifying the type of a camera lens in the image device 110 is applicable to the image device 110 illustrated in FIGS. 4-9. For example, the image device 110 may include the camera lens 112, the one or more stepper motors 114, the one or more H-bridge circuits 116, and the lens-identification circuit 118. The lens-identification circuit 118 may include the impedance network 502 positioned inside the camera lens 112, the fixed impedance 802, the power source 806, and the AD acquisition circuit 804. The impedance network 502 may be in series with the fixed impedance 802. The power source 806 may provide a voltage to the impedance network 502 and the fixed impedance 802.

In some embodiments, the processing device 120 may perform the process 1100 to identify the type of the camera lens 112 when the processing device 120 is instructed so. For example, a user may input instructions for identifying the type of the camera lens 112 through the image device 110, the processing device 120, or the user terminal 130 and transmit the instructions to the processing device 120. In some embodiments, the processing device 120 may automatically perform the process 1100 to identify the type of the camera lens 112. For example, when the processing device 120 drives the camera lens 112, the processing device 120 may obtain a driving manner matching the type of the camera lens 112. If the processing device 120 finds no driving manner matching the type of the camera lens 112 (e.g., the camera lens 112 is used in the image device 110 for the first time), the processing device 120 may automatically perform the process 1100 to identify the type of the camera lens 112.

In 1110, the processing device 120 (e.g., the detection module 1010) may determine an impedance value of the impedance network 502. For example, as shown in FIG. 8 and/or FIG. 9, the AD acquisition circuit 804 may detect the voltage of the fixed impedance 802 and transmit the voltage of the fixed impedance 802 to the processing device 120. The processing device 120 may determine the impedance value of the impedance network 502 based on the voltage provided by the power source 806, the voltage of the fixed impedance 802, and the fixed impedance value of the fixed impedance 802. Details regarding determining the impedance value of the impedance network 502 may be found elsewhere in the present disclosure (e.g., the description in connection with FIG. 12).

In 1120, the processing device 120 (e.g., the determination module 1020) may obtain a predetermined relationship between the impedance value of the impedance network and a type of the camera lens. In some embodiments, the predetermined relationship may be stored in a storage medium (e.g., the storage device 150, the storage 220, the storage 390, the memory 360, etc.) of the image capture system 100. For example, the predetermined relationship may be stored in a device used to identify the type of the camera lens 112, such as the processing device 120 (e.g., a DSP chip).

In 1130, the processing device 120 (e.g., the determination module 1020) may determine the type of the camera lens 112 based on the impedance value of the impedance network 502 and the predetermined relationship between the impedance value of the impedance network 502 and the type of the camera lens 112.

In some embodiments, the determined type of the camera lens 112 may be stored in a storage medium (e.g., the storage device 150, the storage 220, the storage 390, the memory 360, etc.) of the image capture system 100. For example, the determined type of the camera lens 112 may be stored in a device used to drive the camera lens 112, such as the processing device 120 (e.g., a DSP chip). The processing device 120 may drive the camera lens 112 (e.g., drive the camera lens 112 to realize focus and/or zoom) in a manner matching the type of the camera lens 112 (e.g., the focus parameters and/or the exposure parameters of the camera lens 112).

In some embodiments, if there are more than one impedance network in the camera lens, the processing device 120 may determine the impedance value of the more than one impedance network by performing operation 1110 one by one or simultaneously. The predetermined relationship may include a relationship between a combination of the impedance value of the more than one impedance network and the type of the camera lens.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 12:
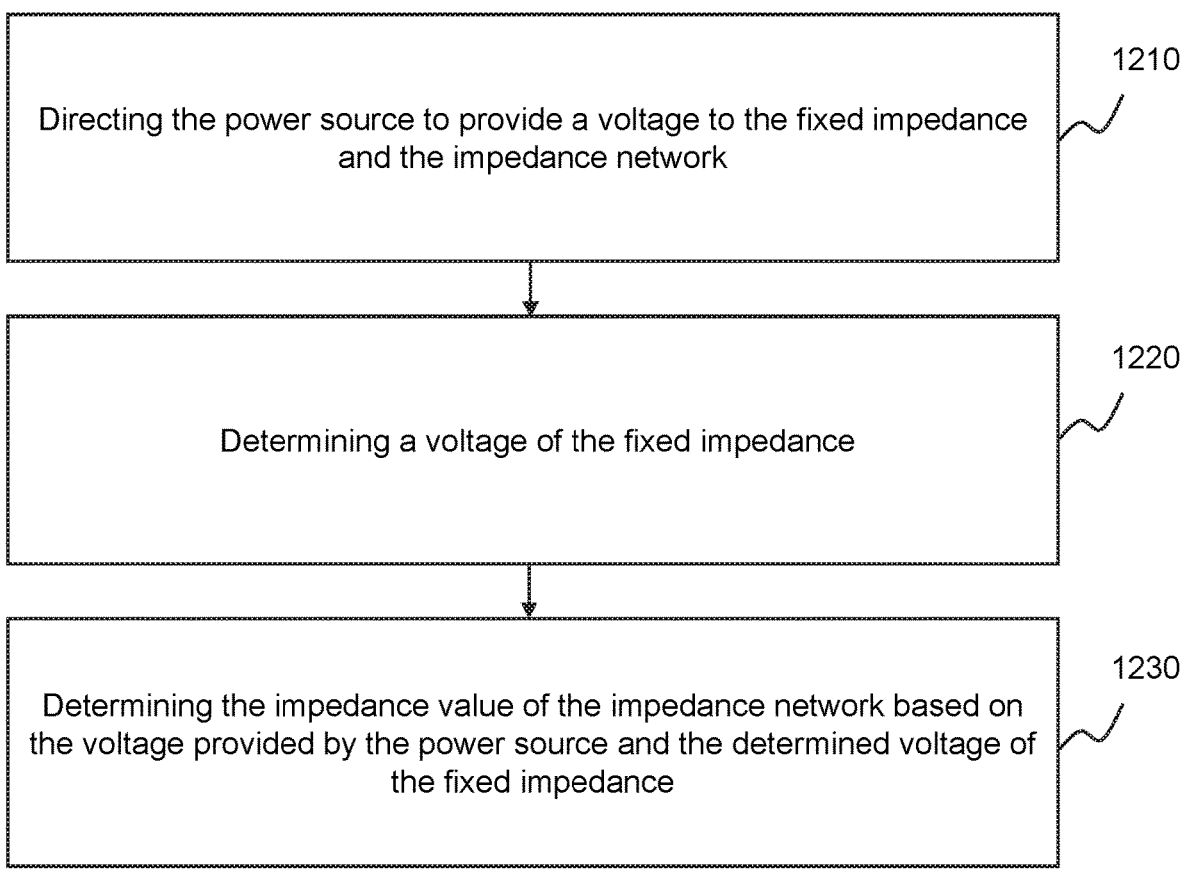
FIG. 12 is a flowchart illustrating an exemplary process for determining an impedance value of an impedance network according to some embodiments of the present disclosure.

FIG. 12 is a flowchart illustrating an exemplary process for determining an impedance value of an impedance network according to some embodiments of the present disclosure. In some embodiments, the process 1200 may be implemented in the image capture system 100 illustrated in FIG. 1. For example, the process 1200 may be stored in a storage medium (e.g., the storage device 150, the storage 220, the memory 360, or the storage 390) as a form of instructions, and can be invoked and/or executed by the processing device 120 (e.g., the processor 210, the CPU 340, or one or more modules in the processing device 120 illustrated in FIG. 10). The operations of the illustrated process 1100 presented below are intended to be illustrative.

In some embodiments, the process 1100 may be accomplished with one or more additional operations not described, and/or without one or more of the operations discussed. Additionally, the order in which the operations of the process 1200 as illustrated in FIG. 12 and described below is not intended to be limiting. In some embodiments, operation 1110 of the process 1100 in FIG. 11 may be performed based on the process 1200.

In 1210, the processing device 120 (e.g., the detection module 1010) may directing the power source 806 to provide a voltage to the fixed impedance 802 and the impedance network 502.

In 1220, the processing device 120 (e.g., the detection module 1010) may determine a voltage of the fixed impedance 802. For example, as shown in FIG. 8 and/or FIG. 9, the AD acquisition circuit 804 may detect the voltage of the fixed impedance 802 and transmit the voltage of the fixed impedance 802 to the processing device 120.

In 1230, the processing device 120 (e.g., the detection module 1010) may determine the impedance value of the impedance network 502 based on the voltage provided by the power source 806 and the determined voltage of the fixed impedance 802.

In some embodiments, the power source 806 may provide a voltage to the impedance network 502 and the fixed impedance 802 that are connected in series. The impedance network 502 and the fixed impedance 802 may be two voltage dividers of the voltage provided by the power source 806.

In some embodiments, according to the relationship between the current and the voltage in a series circuit, the processing device 120 may determine the impedance value of the impedance network 502 based on Equation (1) below:

$$R_{id} = \frac{(V - V_{test}) \times R_{fix}}{V_{test}}, \qquad (1)$$

where $R_{id}$ refers to the impedance value of the impedance network 502, V refers to the voltage provided by the power source 806, $V_{test}$ refers to the determined voltage of the fixed impedance 802, $(V-V_{test})$ refers to a difference between the voltage provided by the power source 806 and the determined voltage of the fixed impedance 802 (e.g., the voltage of the impedance network 502), and $R_{fix}$ refers to the fixed impedance value of the fixed impedance 802.

Alternatively, according to the relationship between the current and the voltage in a series circuit, the processing device 120 may determine the impedance value of the impedance network 502 based on Equation (2) below:

$$R_{id} = \frac{V \times R_{fix}}{V_{test}} - R_{fix}. \qquad (2)$$

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting.

Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. An image device, comprising:
   a camera lens;
   one or more stepper motors to drive the camera lens;
   one or more H-bridge circuits configured to control at least one of the one or more stepper motors;
   a lens-identification circuit connected with the one or more H-bridge circuits, wherein the lens-identification circuit includes an impedance network of which an impedance value corresponds to a type of the camera lens; and
   a switching circuit to turn on or turn off the one or more H-bridge circuits or the lens-identification circuit, wherein when the one or more H-bridge circuits is working to control the one or more stepper motors to drive the camera lens, the switching circuit is signaled to connect with the one or more H-bridge circuits and disconnect with the lens-identification circuit, so as to turn on the one or more H-bridge circuits and turn off the lens-identification circuit, avoiding an interference of the lens-identification circuit in the one or more H-bridge circuits; and
   when the lens-identification circuit is working to identify the type of the camera lens, the switching circuit is signaled to disconnect with the one or more H-bridge circuits and connect with the lens-identification circuit, so as to turn on the lens-identification circuit and turn off the one or more H-bridge circuits, avoiding an interference of the one or more H-bridge circuits in the lens-identification circuit.

2. The image device of claim 1, wherein the impedance network is positioned inside one of the one or more H-bridge circuits.

3. The image device of claim 1, wherein the one or more H-bridge circuits include multiple H-bridge circuits, and the impedance network is positioned between different H-bridge circuits.

4. The image device of claim 3, wherein the different H-bridge circuits control a same stepper motor of the one or more stepper motors or different stepper motors of the one or more stepper motors.

5. The image device of claim 1, wherein the lens-identification circuit further includes a fixed impedance that has a fixed impedance value and is in series with the impedance network, and a power source to provide a voltage to the fixed impedance and the impedance network.

6. The image device of claim 1, wherein the impedance network includes at least one of a resistance, a capacitance, and an inductance.

7. The image device of claim 1, wherein the impedance network is positioned in the camera lens.

8. An image system, comprising:
the image device of claim 1;
at least one storage device including a set of instructions;
at least one processor in communication with the at least one storage device and the image device, wherein when executing the set of instructions, the at least one processor is directed to cause the system to perform operations including:
determining the impedance value of the impedance network;
obtaining a predetermined relationship between the impedance value of the impedance network and the type of the camera lens; and
determining the type of the camera lens based on the impedance value of the impedance network and the predetermined relationship between the impedance value of the impedance network and the type of the camera lens.

9. The image system of claim 8, wherein the lens-identification circuit further includes a fixed impedance that has a fixed impedance value and is in series with the impedance network, and a power source; and
wherein to determine the impedance value of the impedance network, the at least one processor is directed to cause the system to perform additional operations including:
directing the power source to provide a voltage to the fixed impedance and the impedance network;
determining a voltage of the fixed impedance; and
determining the impedance value of the impedance network based on a difference between the voltage provided by the power source and the determined voltage of the fixed impedance.

10. The image system of claim 8, wherein the impedance network is positioned inside one of the one or more H-bridge circuits.

11. The image system of claim 8, wherein the one or more H-bridge circuits include multiple H-bridge circuits, and the impedance network is positioned between different H-bridge circuits.

12. The image system of claim 11, wherein the different H-bridge circuits control a same stepper motor of the one or more stepper motors or different stepper motors of the one or more stepper motors.

13. An image method implemented on a system including the image device of claim 1, one or more processors, and one or more storage devices, the method comprising:
determining the impedance value of the impedance network;
obtaining a predetermined relationship between the impedance value of the impedance network and the type of the camera lens; and
determining the type of the camera lens based on the impedance value of the impedance network and the predetermined relationship between the impedance value of the impedance network and the type of the camera lens.

14. The image method of claim 13, wherein the lens-identification circuit further includes a fixed impedance that has a fixed impedance value and is in series with the impedance network, and a power source; and
wherein the determining of the impedance value of the impedance network includes:
directing the power source to provide a voltage to the fixed impedance and the impedance network;
determining a voltage of the fixed impedance; and
determining the impedance value of the impedance network based on a difference between the voltage provided by the power source and the determined voltage of the fixed impedance.

15. The image method of claim 13, wherein the impedance network is positioned inside one of the one or more H-bridge circuits.

16. The image method of claim 13, wherein the one or more H-bridge circuits include multiple H-bridge circuits, and the impedance network is positioned between different H-bridge circuits.

17. A non-transitory computer readable medium, comprising at least one set of instructions for imaging, wherein when executed by one or more processors of a computing device of a system including the image device of claim 1, the at least one set of instructions causes the computing device to perform a method, the method comprising:
determining the impedance value of the impedance network;
obtaining a predetermined relationship between the impedance value of the impedance network and the type of the camera lens; and
determining the type of the camera lens based on the impedance value of the impedance network and the predetermined relationship between the impedance value of the impedance network and the type of the camera lens.

18. The non-transitory computer readable medium of claim 17, wherein the impedance network is positioned inside one of the one or more H-bridge circuits.

19. The non-transitory computer readable medium of claim 17, wherein the one or more H-bridge circuits include multiple H-bridge circuits, and the impedance network is positioned between different H-bridge circuits.

20. The non-transitory computer readable medium of claim 19, wherein the different H-bridge circuits control a same stepper motor of the one or more stepper motors or different stepper motors of the one or more stepper motors.

* * * * *